Figure 11:
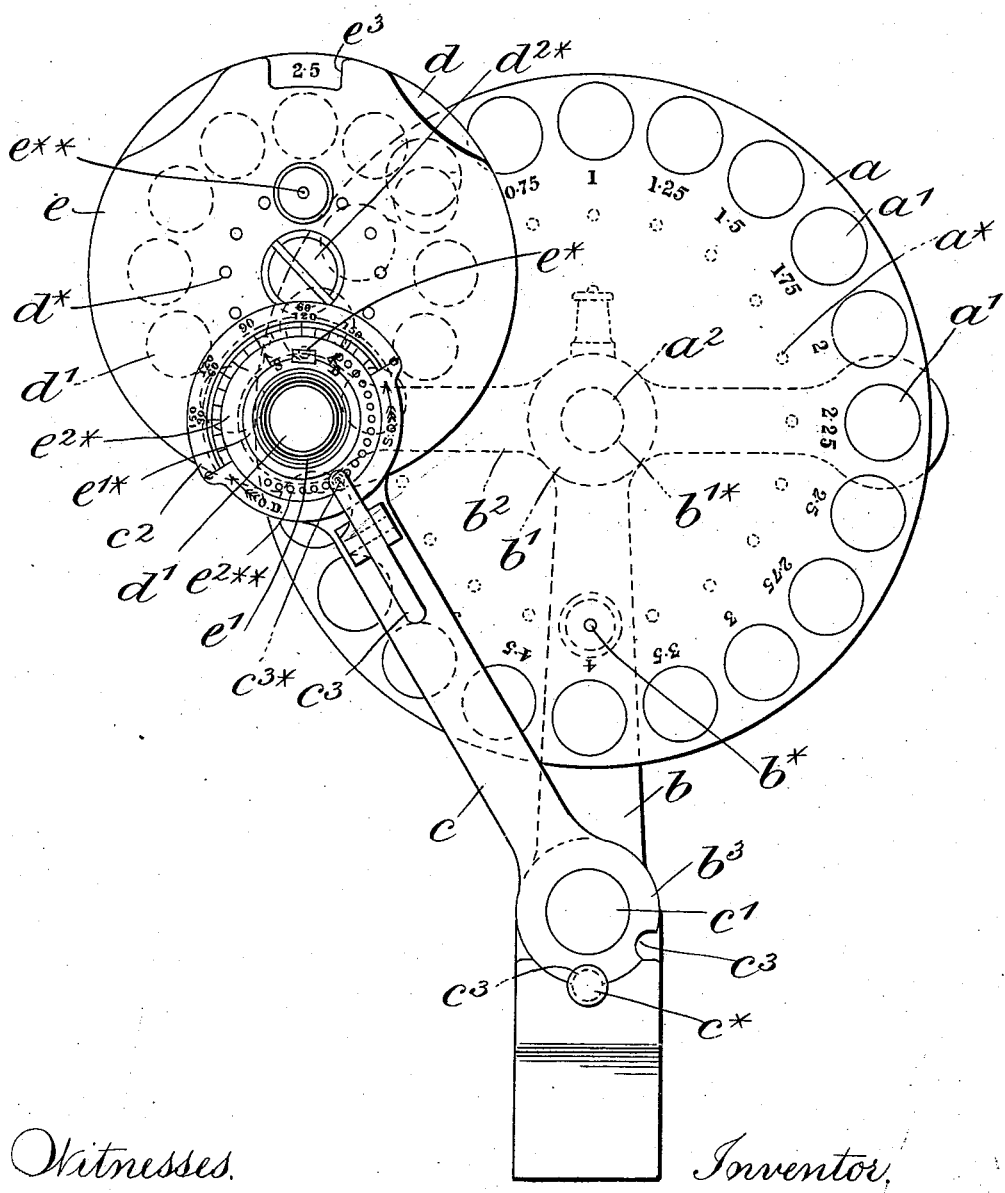

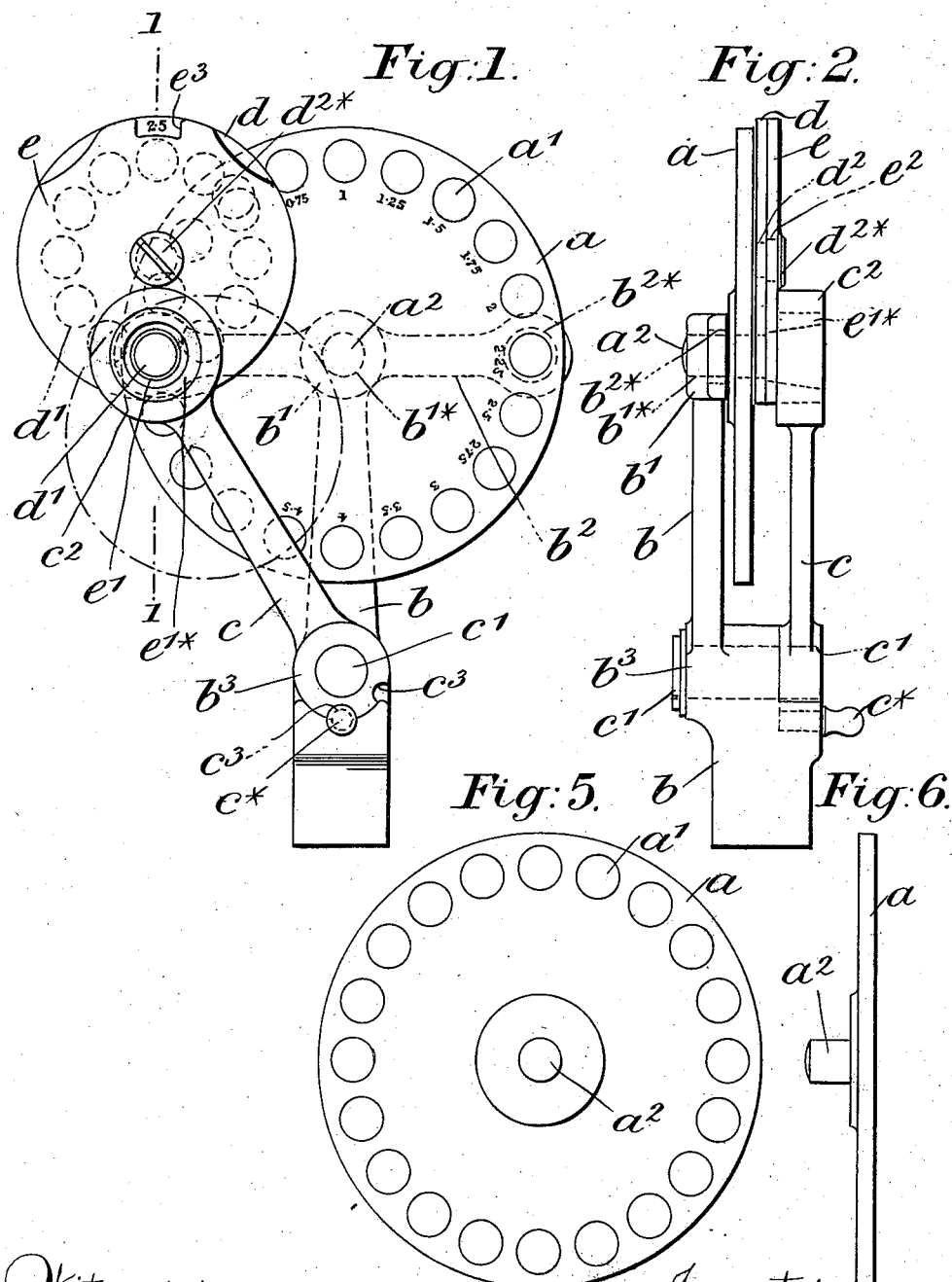

(No Model.) 4 Sheets—Sheet 2.
A. CLARKE.
INSTRUMENT FOR DETERMINING ERRORS OF REFRACTION IN EYES.
No. 564,145. Patented July 14, 1896.
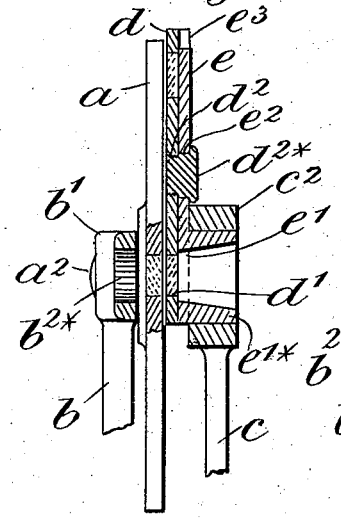
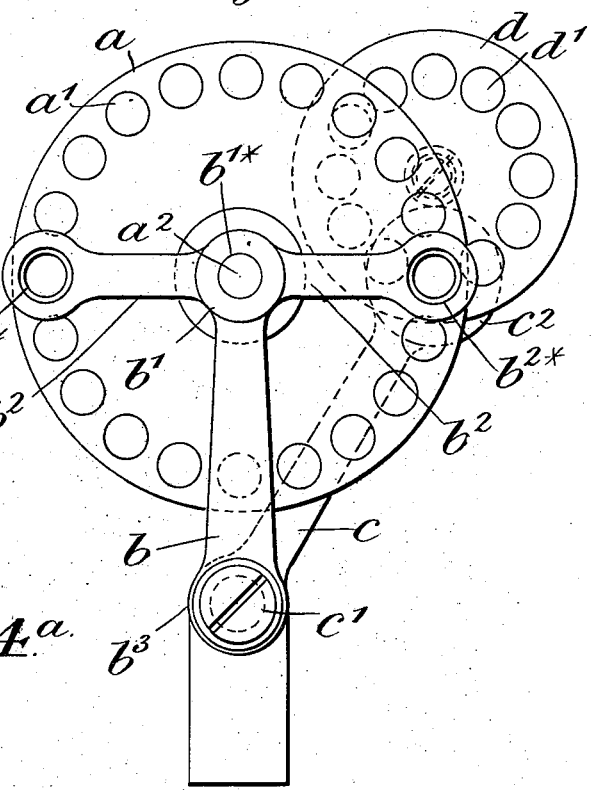
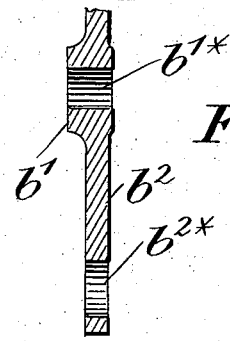
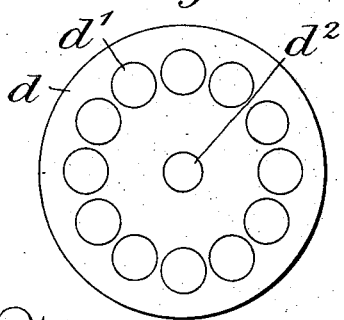
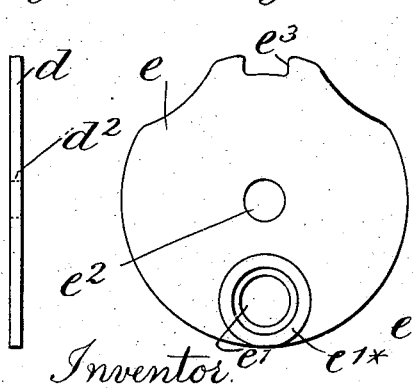
Witnesses.
Walter E. Allen
Fred R. Proctor
Inventor.
Alfred Clarke
By Knight Bros.
Attorneys.
THE NORRIS PETERS CO., PHOTO-LITHO., WASHINGTON, D. C.

(No Model.) 4 Sheets—Sheet 3.

A. CLARKE.
INSTRUMENT FOR DETERMINING ERRORS OF REFRACTION IN EYES.

No. 564,145. Patented July 14, 1896.

Witnesses.
Walter E. Allen.
Fred R. Proctor

Inventor,
Alfred Clarke.
By Knight Bros.
Attorneys.

THE NORRIS PETERS CO., PHOTO-LITHO., WASHINGTON, D. C.

(No Model.) 4 Sheets—Sheet 4.

A. CLARKE.
INSTRUMENT FOR DETERMINING ERRORS OF REFRACTION IN EYES.

No. 564,145. Patented July 14, 1896.

Witnesses.
Walter E. Allen.
Fred R. Proctor.

Inventor.
Alfred Clarke.
By Knight Bros.
Attorneys.

UNITED STATES PATENT OFFICE.

ALFRED CLARKE, OF SYDNEY, NEW SOUTH WALES.

INSTRUMENT FOR DETERMINING ERRORS OF REFRACTION IN EYES.

SPECIFICATION forming part of Letters Patent No. 564,145, dated July 14, 1896.

Application filed October 19, 1895. Serial No. 566,243. (No model.)

*To all whom it may concern:*

Be it known that I, ALFRED CLARKE, optician, a subject of the Queen of Great Britain, residing at 13 Hunter Street, Sydney, in the Colony of New South Wales, have invented certain new and useful Improvements in Instruments for Determining Errors of Refraction in the Eye, of which the following is a specification.

The invention relates to improvements in instruments for determining errors of refraction in the eye, and has for its object to obtain a simple, inexpensive, and efficient means of manipulating and combining certain lenses in the line of sight in the manner necessary for the desired test. The lenses employed in instruments of this character are ordinarily of two kinds, namely, spherical and cylindrical, and the present invention will, for convenience, be described in connection with lenses of that character.

In carrying the invention into effect the spherical lenses are mounted in the manner commonly followed in instruments of a like nature—namely, in a circle of apertures arranged around a disk, near to the periphery thereof, the disk being fixed upon a shaft or axis mounted with capability of revolution in a suitable bearing carried by a standard or upright. The standard is at its upper part constructed with lateral horizontal arms, which together with the standard form a T shape, and the bearing for the shaft of the spherical-lens disk is formed in a boss located at the junction of the standard and horizontal arms. At the end of each horizontal arm is provided a circular aperture, so arranged that as the spherical-lens disk is revolved the lens-apertures therein will coincide in succession with the circular apertures in the horizontal arms of the standard. The horizontal arms form a rest or support against which the forehead of a patient may be steadied, with that eye whose refraction it is desired to determine opposite the aperture in the corresponding horizontal arm, so that upon the spherical-lens disk being revolved upon its axis the spherical lenses carried thereby can be brought before the eye in rapid succession.

In order to carry and facilitate the manipulation of the cylindrical lenses, the following arrangement of parts is employed: The lower end of the standard is enlarged to form a boss, in which is formed a horizontal bearing, arranged at right angles or perpendicular to the horizontal arms, and in this bearing is mounted with capability of revolution a shaft upon which is fixed the lower end of a radius arm, the parts being so arranged that the upper end of this arm is adapted to traverse the spherical-lens disk from side to side in either direction. The upper end of this radius-arm is provided with an apertured boss, which forms a bearing, for the purpose hereinafter described, and the radius-arm may, when required, be temporarily fixed in such position that the center of this bearing coincides with the center of either of the apertures at the ends of the horizontal arms of the standard.

The cylindrical lenses are mounted in apertures arranged in a circle around a disk, in a similar manner to that hereinbefore described with respect to the spherical lenses, and this cylindrical-lens disk is axially provided with a shaft, which is mounted in a corresponding bearing formed in a circular plate or disk carrier, so that the cylindrical-lens disk can be revolved with relation to the disk-carrier.

In the disk-carrier and near to its circumference is formed an aperture corresponding with one of the ring of apertures in the cylindrical-lens disk, so that as the cylindrical-lens disk is rotated over the disk-carrier each cylindrical lens in the circle will successively pass centrally before the aperture of the disk-carrier. Upon the face of the disk-carrier and surrounding the aperture is formed or fixed an apertured boss the outer surface of which is turned to form a shaft, which is mounted in the bearing formed in the upper end of the radius-arm hereinbefore described.

By the peculiar arrangement of parts hereinbefore described the cylindrical-lens disk can be rotated so as to bring all the lenses in succession before the aperture or boss of the disk-carrier, and by rotating the disk-carrier with its boss as the center of rotation in the bearing at the upper end of the radius-arm any cylindrical lens of the circle which is before the aperture or boss of the disk-carrier, and therefore before the eye of the patient, will be revolved around its own axis. The axis of the cylindrical lens which is before the eye can thus be inclined at any angle without the employment of toothed gearing or other devices. Furthermore, if the cylindrical lenses are mounted in their disk in a uniform position as regards the direction of their axes they will each assume the same axial direction as they are successively brought by the rotation of their disk in front of the aperture and boss of the disk-carrier. By these means any particular cylindrical lens can be placed in any axial inclination and in combination with any particular spherical lens and opposite the aperture in either horizontal arm of the standard.

In order that the said invention may be more clearly understood and readily carried into effect, I will proceed, aided by the accompanying drawings, more fully to describe the same.

Figure 12:
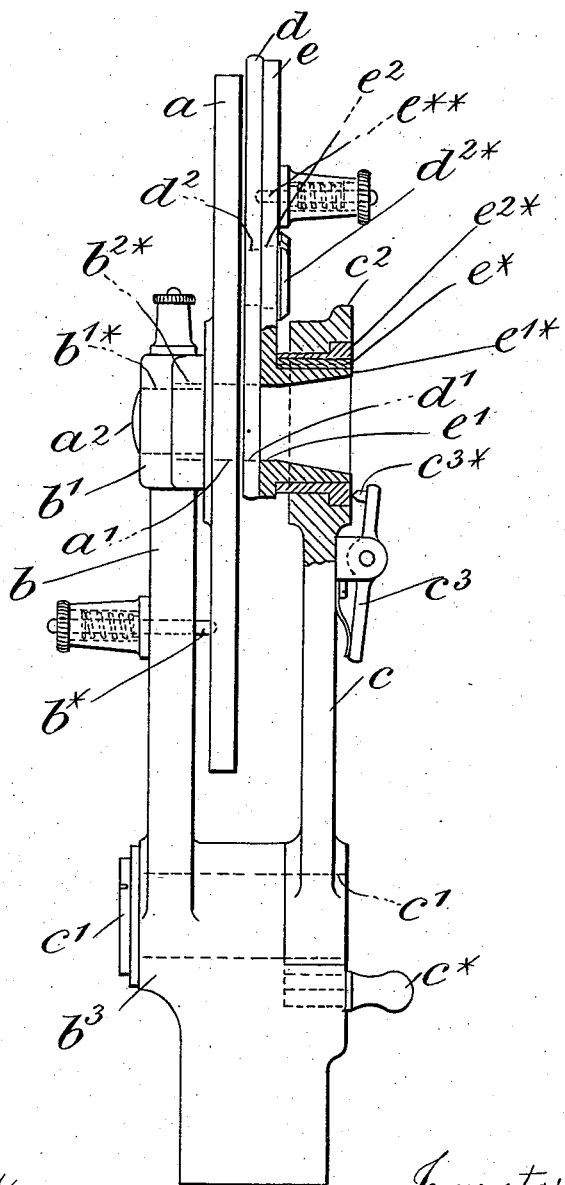

In the drawings, Figure 1 is a front elevation of an instrument constructed according to the present invention. Fig. 2 is a side elevation thereof. Fig. 3 is a rear elevation thereof. Fig. 4 is a vertical transverse section taken on the line 1 1 of Fig. 1. Fig. 4$^a$ is a horizontal section of part. Fig. 5 is a rear elevation of the spherical-lens disk separately. Fig. 6 is an edge view thereof. Fig. 7 is a front elevation of the cylindrical-lens disk separately. Fig. 8 is an edge view thereof. Fig. 9 is a front elevation of the disk-carrier, and Fig. 10 is an edge view thereof. Fig. 11 is a front elevation of a complete instrument embodying some slight modifications and drawn to a slightly-increased scale. Fig. 12 is a side elevation thereof, partly in section.

In the several figures like parts are indicated by similar letters of reference.

Referring to Figs. 1 to 10, $a$ represents the spherical-lens disk, which near to the periphery thereof is provided with a circle of apertures $a'$, in which are mounted the spherical lenses, and this disk $a$ is fixed upon a shaft or axis $a^2$, mounted with capability of revolution in a bearing $b'^*$, carried by a standard or upright $b$.

The standard $b$ is at its upper part constructed with lateral horizontal arms $b^2$, which, together with the standard $b$, form a T shape, and the bearing for the shaft $a^2$ of the spherical-lens disk $a$ is formed in a boss $b'$, located at the junction of the standard $b$ and horizontal arms $b^2$. At the end of each horizontal arm $b^2$ is provided a circular aperture $b^{2*}$, so arranged that as the spherical-lens disk $a$ is revolved the lens-apertures $a'$ therein will coincide in succession with the circular apertures $b^{2*}$ in the horizontal arms $b^2$ of the standard $b$.

The horizontal arms $b^2$ form a rest or support against which the forehead of a patient may be steadied, with that eye whose refraction it is desired to determine opposite the aperture $b^{2*}$ in the corresponding horizontal arm $b^2$, so that upon the spherical-lens disk $a$ being revolved upon its axis $a^2$ the spherical lenses carried thereby can be brought before the eye in rapid succession.

In order to carry and facilitate the manipulation of the cylindrical lenses, the following arrangement of parts is employed: The lower end of the standard $b$ is enlarged to form a boss $b^3$, in which is formed a horizontal bore or bearing arranged at right angles or perpendicular to the horizontal arms $b^2$, and in this bearing is mounted with capability of revolution a shaft $c'$, upon which is fixed the lower end of a radius-arm $c$, the parts being so arranged that the upper end of the radius-arm $c$ is adapted to traverse the spherical-lens disk $a$ from side to side in either direction. The upper end of the radius-arm $c$ is provided with an apertured boss $c^2$, which forms a bearing for the purpose hereinafter described, and the radius-arm $c$ may, when required, by means of a pin $c^*$, entering a hole formed in the standard $b$ and engaging one of two notches $c^3$, formed in the lower end of the radius-arm $c$, be temporarily fixed in such position that the center of the bearing in the boss $c^2$ coincides with the center of either of the apertures $b^{2*}$ at the ends of the horizontal arms $b^2$ of the standard $b$.

The cylindrical lenses are mounted in apertures $d'$, arranged in a circle around a disk $d$ in a similar manner to that hereinbefore described with respect to the spherical lenses, and this cylindrical-lens disk $d$ is axially provided with an aperture $d^2$, threaded to receive the screw end of a stud or shaft $d^{2*}$, which is mounted in a bearing $e^2$, formed in a circular plate or disk carrier $e$, so that the cylindrical-lens disk $d$ can be revolved with relation to the disk-carrier $e$.

In the disk-carrier $e$ and near to its circumference is formed an aperture $e'$, corresponding with one of the ring of apertures $d'$ in the cylindrical-lens disk $d$, so that as the cylindrical-lens disk $d$ is rotated over the disk-carrier $e$ each cylindrical lens in the circle will successively pass centrally before the aperture $e'$ of the disk-carrier $e$.

Upon the face of the disk-carrier $e$ and surrounding the aperture $e'$ is formed or fixed an apertured boss $e'^*$, the outer surface or circumference of which is turned to form a shaft or axis which is mounted in the bearings formed in the boss $c^2$ at the upper end of the radius-arm $c$, as hereinbefore described.

By the peculiar arrangement of parts hereinbefore described the cylindrical-lens disk $d$ can be rotated so as to bring all the cylindrical lenses in succession before the aperture $e'$ and apertured boss $e'^*$ of the disk-carrier $e$, and by rotating the disk-carrier $e$ with its boss $e'^*$ as the center of rotation in the bearing in the boss $c^2$ at the upper end of the radius-arm $c$ any cylindrical lens of the circle which is before the aperture $e'$ and boss $e'^*$ of the disk-carrier $e$, and therefore before the eye of the patient, will be revolved around its own axis. The axis of the cylindrical lens which is before the eye of the patient can thus be inclined at any angle without the employment of toothed gearing or other devices. Furthermore, if the cylindrical lenses are mounted in their disk $d$ in a uniform position as regards the direction of their axes, they will each assume the same axial direction as they are successively brought by the rotation of their disk $d$ in front of the aperture $e'$ and boss $e'^*$ of the disk-carrier $e$.

The spherical-lens disk $a$ is provided with a circle of numbers identifying the lenses carried in the apertures $a'$, and the cylindrical-lens disk $d$ is similarly provided with a circle of indications, which latter are exposed in the desired order at a notch or aperture $e^3$ in the disk-carrier $e$, as shown more particularly at Fig. 1. By these means any particular cylindrical lens of the apertures $d'$ can be placed in any axial inclination and in combination with any particular spherical lens of the apertures $a'$ and opposite the aperture $b^{2*}$ in either horizontal arm $b^2$ of the standard $b$.

In the example given at Figs. 11 and 12 the device is identical in principle with that hereinbefore described, but some of the details of construction are slightly improved. In this case the boss $e'^*$ of the disk-carrier $e$ has fixed therewith by a key or feather $e^*$ a collar $e^{2*}$, which forms the shaft or axis revolving in the bearing in the boss $c^2$ of the radius-arm $c$, and the face of the boss $c^2$ of the radius-arm $c$ is marked with a graduated scale, while the face of the loose collar $e^{2*}$ is marked with two arrows, by the aid of which the inclination of the axis of the cylindrical lens before the eye at any moment can be ascertained, while in order to temporarily fix the disk-carrier $e$ in the desired position a pin or detent $c^{3*}$ is fixed upon a spring thumb-lever $c^3$ and engages a circle of notches or recesses $e^{2**}$ formed in the collar $e^{2*}$.

The spherical-lens disk $a$ is also adapted to be temporarily locked in the desired position by means of a spring-bolt $b^*$, carried by the standard $b$ and engaging a circle of indents or recesses $a^*$ in the spherical-lens disk $a$, while a similar bolt $e^{**}$, carried by the disk-carrier $e$, engages a corresponding circle of indents $d^*$ in the cylindrical-lens disk $d$ with the same object.

Having now particularly described and ascertained the nature of the said invention and in what manner the same is to be performed, I declare that what I claim is—

1. In an instrument of the character herein referred to the combination of a T-shaped stand, and a radius-arm having one end pivotally mounted upon the stand so that its other and outer end is adapted to be moved in an arc from one extremity of the horizontal limbs of the T to the other extremity thereof substantially as herein shown and described and for the purpose stated.

2. In an instrument of the character herein referred to the combination of a disk mounted upon a stand with capability of rotation and carrying a circle of lenses arranged around its circumference, a radius-arm having one end pivotally mounted on the stand and its other and outer end adapted to traverse the lens-disk, a disk-carrier eccentrically mounted with capability of rotation upon the outer end of the radius-arm and a second lens-disk concentrically mounted with capability of rotation upon the disk-carrier substantially as herein shown and described and for the purpose stated.

3. In an instrument of the character herein referred to, the combination of a T-shaped stand provided with apertures at the ends of its horizontal limbs, a disk mounted upon the stand with capability of rotation and carrying a circle of lenses intersecting or corresponding with the apertures of the horizontal limbs, a radius-arm having one end pivotally mounted on the stand and its other and outer end formed with an apertured boss adapted to traverse the lens-disk from side to side so that in either of its extreme positions its aperture will coincide with one of the apertures of the horizontal limbs of the stand, a disk-carrier provided with an eccentrically-disposed apertured boss pivotally mounted in the apertured boss of the radius-arm and a second disk furnished with a circle of lenses and concentrically mounted with capability of rotation upon the disk-carrier in such manner that the circle of lenses intersects or corresponds with the apertured boss of the radius-arm substantially as herein shown and described and for the purpose stated.

ALFRED CLARKE.

Witnesses:
W. I. MacPhee,
Edward P. Tobin.